US012763443B2

(12) United States Patent
Zhang et al.

(10) Patent No.: US 12,763,443 B2
(45) Date of Patent: Oct. 13, 2026

(54) BATTERY HOUSING AND BATTERY

(71) Applicant: HeFei Guoyan Xinneng Lithium Industry Co., Ltd, Hefei (CN)

(72) Inventors: Fengxue Zhang, Shenzhen (CN); Zujian Xia, Shenzhen (CN)

(73) Assignee: HeFei Guoyan Xinneng Lithium Industry Co., Ltd., Hefei (CN)

( * ) Notice: Subject to any disclaimer, the term of this patent is extended or adjusted under 35 U.S.C. 154(b) by 491 days.

(21) Appl. No.: 18/497,773

(22) Filed: Oct. 30, 2023

(65) Prior Publication Data

US 2024/0063519 A1 Feb. 22, 2024

Related U.S. Application Data

(63) Continuation of application No. PCT/CN2021/141447, filed on Dec. 27, 2021.

(30) Foreign Application Priority Data

Apr. 30, 2021 (CN) ........................ 202110485337.6

(51) Int. Cl.
*H01M 50/586* (2021.01)
*H01M 50/109* (2021.01)
(Continued)

(52) U.S. Cl.
CPC ....... *H01M 50/586* (2021.01); *H01M 50/109* (2021.01); *H01M 50/14* (2021.01);
(Continued)

(58) Field of Classification Search
CPC ........... H01M 10/0427; H01M 50/109; H01M 50/119; H01M 50/14; H01M 50/153; H01M 50/159; H01M 50/16; H01M 50/164; H01M 50/166; H01M 50/169; H01M 50/171; H01M 50/186; H01M 50/193; H01M 50/559; H01M 50/586; H01M 50/593; Y02E 60/10
See application file for complete search history.

(56) References Cited

U.S. PATENT DOCUMENTS

2005/0014064 A1* 1/2005 Matsubara .......... H01M 50/562
429/180

FOREIGN PATENT DOCUMENTS

| | | | | |
|---|---|---|---|---|
| CN | 111416068 A | * | 7/2020 | .......... H01M 50/166 |
| KR | 20200020619 A | * | 2/2020 | .......... H01M 2/0287 |
| WO | WO-2020037535 A1 | * | 2/2020 | .......... H01M 50/181 |

* cited by examiner

*Primary Examiner* — Daniel S Gatewood
(74) *Attorney, Agent, or Firm* — Westbridge IP LLC

(57) ABSTRACT

Disclosed are a battery housing and a battery. The battery housing includes a bottom shell and a cover. The cover includes an outer contact layer, an insulating layer, and an inner contact layer. The electrode connecting portion of the inner contact layer is electrically connected to one pole of the battery cell. The other pole of the battery cell is electrically connected to the bottom shell. Since the inner contact layer and the outer contact layer are insulated through the insulating layer, the bottom shell is also insulated from the inner contact layer, thereby preventing the two electrodes of the battery cell from being mutually connected and short-circuited. Since the inner contact layer and the outer contact layer of the cover are pre-insulated, the insulating film is not needed, thereby simplifying the packaging process of the battery and improving the packaging efficiency.

16 Claims, 7 Drawing Sheets

(51) Int. Cl.
*H01M 50/14* (2021.01)
*H01M 50/153* (2021.01)
*H01M 50/159* (2021.01)
*H01M 50/16* (2021.01)
*H01M 50/164* (2021.01)
*H01M 50/169* (2021.01)
*H01M 50/593* (2021.01)

(52) U.S. Cl.
CPC ....... *H01M 50/153* (2021.01); *H01M 50/159* (2021.01); *H01M 50/16* (2021.01); *H01M 50/164* (2021.01); *H01M 50/169* (2021.01); *H01M 50/593* (2021.01)

BATTERY HOUSING AND BATTERY

CROSS-REFERENCE TO RELATED APPLICATIONS

This application is a continuation of International Application No. PCT/CN2021/141447, filed on Dec. 27, 2021, which claims priority to Chinese Patent Application No. 202110485337.6, filed on Apr. 30, 2021. All of the aforementioned applications are incorporated herein by reference in their entireties.

TECHNICAL FIELD

The present disclosure relates to the technical field of batteries, and in particular, to a battery housing and a battery.

BACKGROUND

A battery housing of an existing button battery is formed by splicing a positive housing and a negative housing. The positive housing and the negative housing need to be insulated to avoid short circuit of the button battery. The related art achieves insulation by providing an insulating film located between the positive housing and the negative housing, and the positive housing and the negative housing are welded. It is difficult to arrange the insulating film in the battery during the machining process. The machining difficulty of the button battery is large, which reduces the machining efficiency.

SUMMARY

The main purpose of the present application is to provide a battery housing, which is used for a button battery, and aims to solve the technical problem of how to improve battery processing efficiency and sealing performance.

In order to achieve the above purpose, the battery housing provided by the present application includes a cup-shaped bottom shell and a cover. The bottom shell includes a circular or oval bottom wall and an annular side wall. The cup-shaped bottom shell defines a receiving opening. The cover is configured to seal the receiving opening. The cover sequentially includes an outer contact layer, an insulating layer, and an inner contact layer from outside to inside. The inner contact layer includes outer electrical connecting portion, an electrode connecting portion, and a conductive bonding portion. The insulating layer includes an insulating bonding portion and an insulating opening portion. The outer contact layer includes a welding portion, a welding bonding portion, and a welding opening portion. The side wall includes a welding support portion close to the receiving opening. A maximum outer diameter of the outer contact layer is D1, a maximum outer diameter of the inner contact layer is D2, and D1 is greater than D2. The electrode connecting portion is located on a surface of the inner contact layer facing towards an inner side of the battery housing. The electrode connecting portion is configured to be electrically connected to a pole of a battery cell to enable the inner contact layer to be electrically connected to the battery cell. The outer electrical connecting portion is configured to pass through the insulating opening portion and the welding opening portion to be electrically connected to an outer device. The conductive bonding portion is configured to be seamlessly bonded to the insulating bonding portion, to enhance a strength of the cover and reduce a direct contact area between the insulating bonding portion and an inner side of the battery housing, and to prevent external water from permeating into the battery housing. The welding portion is configured to be welded with the welding supporting portion, thereby enabling the cover and the bottom shell to be sealed. The welding bonding portion is configured to enhance the strength of the cover and prevent external water from permeating into the battery housing. The insulating bonding portion is configured to be seamlessly bonded to the conductive bonding portion and the welding bonding portion by melting an insulating anti-electrolyte corrosion material at >=100° C. before the cover and the bottom shell are sealed. The insulating anti-electrolyte corrosion material has a thermal shrinkage rate of 6%, and a bonding strength, between the insulating bonding portion and the conductive bonding portion or between the insulating bonding portion and the welding bonding portion, is greater than or equal to 1.0 N per square millimeter after the insulating anti-electrolyte corrosion material is at a room temperature. A thickness of the insulating bonding portion is D3, and D3 is 0.01 mm-2.5 mm. The contact area between the insulating bonding portion and the inner side of the battery housing is S0, and S0 satisfies: S0>=π*D2*D3*½.

Optionally, the outer contact layer is made of stainless steel, and a thickness of the outer contact layer is D4 and D4 is 0.1 mm-0.25 mm; and/or the inner contact layer is made of stainless steel, and a thickness of the inner contact layer is D5 and D5 is 0.1 mm-0.25 mm.

Optionally, the insulating layer is made of one or more of PP, PFA, PVDF, PTFE, ETFE and PVC.

Optionally, a bonding strength between the insulating bonding portion and the conductive bonding portion, or between the insulating bonding portion and the bonding portion, is less than or equal to 5.0 N/mm at a room temperature.

Optionally, an area of the insulating bonding portion is S1, and an area of the insulating layer is S2, and an area of the outer contact layer is S3, and S1, S2, S3 satisfy: S1/S2>=0.6 and/or S1/S3>=0.5.

Optionally, a first bonding enhancement layer is placed on a first surface of the conductive bonding portion facing towards the insulating bonding portion; the first bonding enhancement layer is configured to reinforce a bonding strength between the insulating bonding portion and the conductive bonding portion; and/or a second bonding enhancement layer is placed on a second surface of the welding bonding portion close to the insulating bonding portion, and the second bonding enhancement layer is configured to reinforce a bonding strength between the insulating bonding portion and the welding bonding portion.

Optionally, the outer connecting portion is located at bottom portions of the insulation opening portion and the welding opening portion.

Optionally, the connecting portion protrudes toward an outer side of the battery housing and is configured to sequentially pass through the insulation opening portion and the welding opening portion, and a diameter of the outer connecting portion is less than or equal to a half of the maximum outer diameter of the inner contact layer.

Optionally, the battery housing further comprises a protection member, and the protection member is formed by curing a liquid glue at a room temperature after the cover and the bottom shell are sealed, and the liquid glue is filled in a gap among the outer electrical connecting portion, the insulation opening portion, and the welding opening portion.

The present application further provides a battery. The battery includes a battery cell and the battery housing as described above. Wherein one electrode of the battery cell is electrically connected to the outer contact layer of the battery housing, and the other electrode is electrically connected to the inner contact layer and/or the bottom shell of the battery housing.

In the present application, the battery housing includes the bottom shell and the cover, and the cover includes an outer contact layer, an insulating layer and an inner contact layer. Wherein the electrode connecting portion of the inner contact layer is electrically connected to a pole of a battery cell and another pole of the battery cell is electrically connected with the bottom shell. The inner contact layer and the bottom shell are welded to enable the battery cell to be packaged, and the inner contact layer and the outer contact layer are insulated through the insulating layer. The bottom shell is also insulated from the inner contact layer, and the two poles of the battery cell can be prevented from being mutually conducted and short-circuited. Since the inner contact layer and the outer contact layer of the cover are pre-insulated, the outer contact layer and the bottom shell just need to be welded when the bottom shell is packaged by the cover, and the insulating film does not need to be arranged, so that the packaging process of the battery can be simplified, and the packaging efficiency is improved. In addition, the contact area between the insulating bonding portion and the inner side of the battery housing is S0 and S0 satisfies: $S0>=\pi*D2*D3*½$, which enables the bonding area between the insulating bonding portion and the inner contact layer and the bonding area between the insulating bonding portion and the outer contact layer can be increased, thereby improving the bonding stability.

DETAILED DESCRIPTION OF THE EMBODIMENTS

Figure 1:
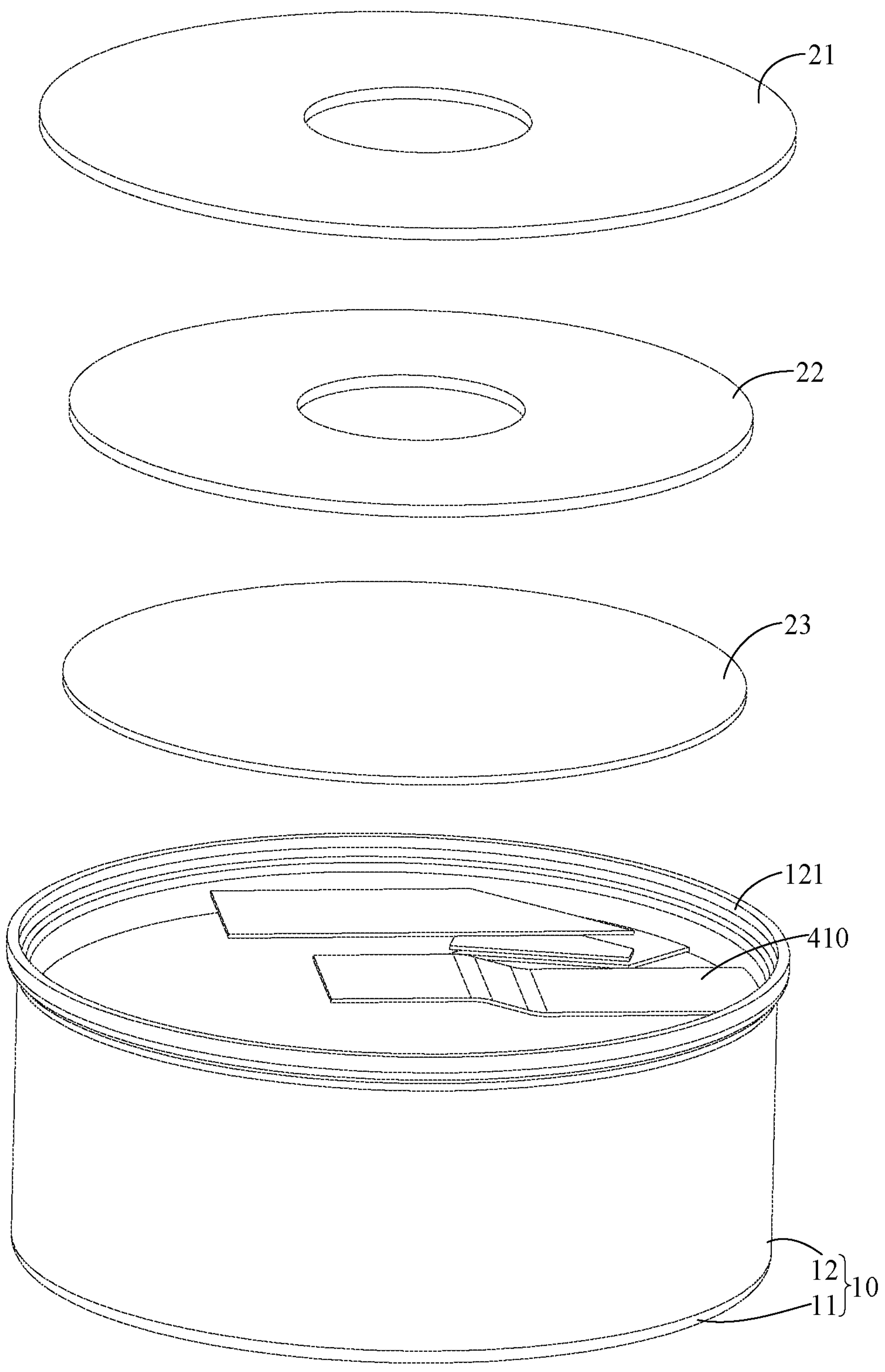
FIG. 1 is an exploded view of an embodiment of a battery housing.
Figure 2:
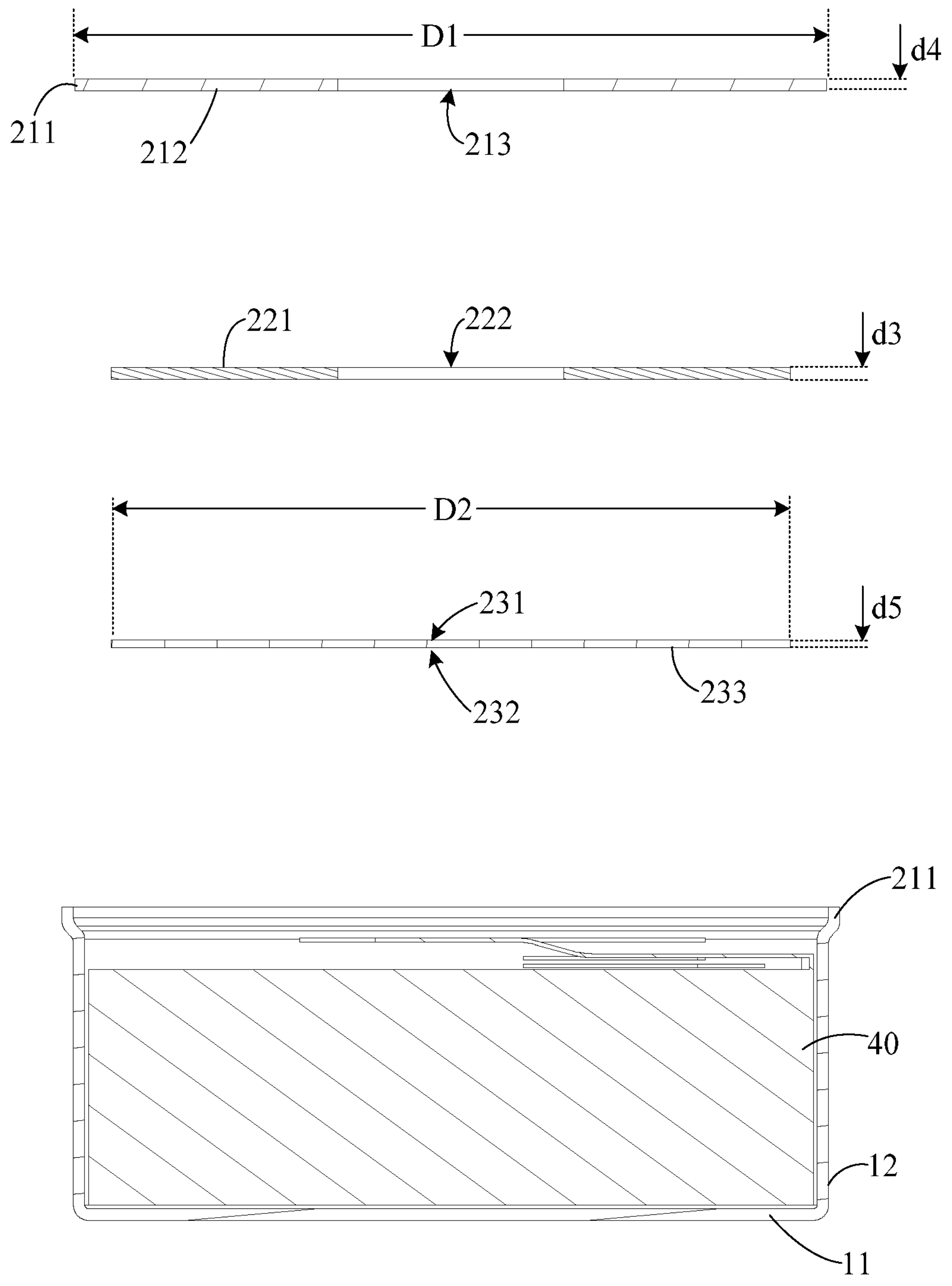
FIG. 2 is a cross-sectional and exploded view of a first embodiment of a battery housing.

The following content combines with the figures and the embodiments for describing the present disclosure in detail. It is obvious that the following embodiments are only some embodiments of the present application. For an ordinary person skilled in the art without any creative effort, other embodiments obtained thereby are still covered by the present application.

It should be noted that, if the embodiments of the present disclosure relate to directional indication (such as up, down, left, right, front, and back). For example, the directivity indication is only used to explain the relative position relationship, the motion situation, etc. between the components under a certain specific posture (as shown in the drawings), and if the specific posture changes, the directional indication also changes accordingly.

In addition, if the embodiments of the present disclosure relate to descriptions such as "first" and "second", the descriptions of "first", "second" and the like are only used for descriptive purposes, and cannot be understood as indicating or implying their relative importance or implicitly indicating the number of indicated technical features. Thus, the features defined with "first" and "second" may explicitly or implicitly include at least one of the features. In addition, the meaning of "and/or" appearing in the entire text is, including three parallel solutions, using "A and/or B as an example", including solution A, or solution B, or solutions A and B satisfied at the same time. In addition, the technical solutions between the various embodiments may be combined with each other, but must be based on those of ordinary skill in the art, and when the combination of the technical solutions is contradictory or cannot be implemented, it should be considered that the combination of the technical solutions does not exist or is not within the protection scope of the present disclosure.

The present disclosure provides a battery housing for a button battery.

In the embodiment of the present disclosure, as shown in FIGS. 1 to 8, the battery housing includes a cup-shaped bottom shell 10 and a cover 20. The bottom shell 10 defines a receiving opening. The bottom shell 10 includes a circular or oval bottom wall 11 and an annular side wall 12. The cover 20 sequentially includes an outer contact layer 21, an insulating layer 22, and an inner contact layer 23 from outside to inside. A maximum outer diameter of the outer contact layer 21 is D1, a maximum outer diameter of the inner contact layer 23 is D2, and D1 is greater than D2. The inner contact layer 23 includes an outer electrical connecting portion 231, an electrode connecting portion 232, and a conductive bonding portion 233. The insulating layer 22 includes an insulating bonding portion 221 and an insulating opening portion 222. The outer contact layer 21 includes a welding portion 211, a welding bonding portion 212, and a welding opening portion 213. The side wall includes a welding support portion 121 close to the receiving opening. The electrode connecting portion is located on a surface of the inner contact layer 23 facing towards an inner side of the battery housing. The electrode connecting portion is configured to be electrically connected to a pole 410 of a battery cell 40 to enable the inner contact layer 23 to be electrically connected to the battery cell 40. The outer electrical connecting portion 231 is configured to pass through the insulating opening portion 222 and the welding opening portion 213 to be electrically connected to an outer device. The conductive bonding portion 233 is configured to be seamlessly bonded to the insulating bonding portion 221, so as to enhance the strength of the cover 20 and reduce a direct contact area between the insulating bonding portion 221 and an inner side of the battery housing, and to prevent external water from permeating into the battery housing. The welding portion 211 is configured to be welded to the welding support portion 121, thereby enabling the cover 20 and the bottom shell 10 to be sealed. The welding bonding portion 212 is configured to enhance the strength of the cover 20 and prevent external water from permeating into the battery housing.

Before the cover 20 and the bottom shell 10 are sealed, the insulating bonding portion 221 is seamlessly bonded to the conductive bonding portion 233 and the welding bonding portion 212 by melting an insulating anti-electrolyte corrosion material at >=100° C., and the insulating anti-electrolyte corrosion material has a thermal shrinkage rate of 6%. The bonding strength, between the insulating bonding portion 221 and the conductive bonding portion 233 or between the insulating bonding portion 221 and the welding bonding portion 212, is greater than or equal to 1.0 N per square millimeter at a room temperature. The thickness of the insulating bonding portion 221 is D3, and D3 is 0.01 mm-2.5 mm. The contact area between the insulating bonding portion 221 and the inner side of the battery housing is S0, and S0 satisfies: S0>=π*D2*D3*½. Specifically, D3 may be one of 0.01 mm, 0.05 mm, 0.1 mm, 0.15 mm, 0.2 mm, 0.25 mm, 0.3 mm, 0.35 mm, 0.5 mm, 1.0 mm, 1.2 mm, 1.4 mm, 1.6 mm, 1.8 mm, 2.0 mm, and 2.5 mm. For a small button battery, D1 is preferred to be 0.15 mm-0.25 mm. It should be understood that the specific thickness of the insulation bonding portion 221 may be specifically designed according to a specific product, and preferably, the insulating bonding portion 221 and the insulating layer 22 are integrally formed.

Compared with the prior art, the battery housing of the present disclosure is sealed by welding instead of being sealed by means of physical stress extrusion between the housings, which improves the sealing performance and the stability. Since the cover 20 is made in advance and is insulated by the insulating bonding portion 221, the insulativity is improved, and the protective effect can be achieved under a certain condition. In addition, the cover 20 of the battery housing of the present disclosure adopts a three-layer structure which has strong structural stability and firmness. Since the insulating bonding portion is located between the two layers of stainless steel, the waterproof and anti-electrolyte corrosion properties of the cover are very strong. The contact area between the insulating bonding portion 221 and the outer side of the battery housing is very small, so that external water can be effectively prevented from entering the battery housing. The path length between one part of the insulating bonding portion 221, out of the battery housing, and another part of the insulating bonding portion 221 in the battery housing is long and the contact area is small, thereby further avoiding the influence of external water and the like on the battery cell and the electrolyte in the battery housing. In the same reasoning, only the inner edge of the insulating bonding portion 221 can be in contact with the electrolyte in the battery housing, so that the contact area between the electrolyte and the insulating bonding portion 221 can be effectively reduced and the insulating bonding portion 221 can be effectively protected. The influence of softening, corrosion and the like of the electrolyte on the insulating bonding portion 221 is avoided, and the service life of the battery is effectively prolonged. The path of insulating bonding portion 221 from the inner side of the battery housing to the outer side of the battery housing is long, and the service life of the battery can be further prolonged.

The bottom shell 10 may be made of a stainless steel plate, and the receiving opening of the bottom shell 10 faces upwards to receive the battery cell 50 and the electrolyte. Wherein the bottom wall 11 and the side wall 12 may be integrally formed by injection molding, or may be welded, which is not limited herein. The outer contact layer 21 and the inner contact layer 23 of the cover 20 may be made of a stainless steel plate. Wherein the electrode connecting portion 232 of the inner contact layer 23 faces towards the inner side of the battery housing for being connected to an electrode of the battery cell 40. The outer contact layer 21 is connected to the other electrode of the battery cell 40 by being connected to the bottom shell 10. Since the insulating layer 22 is located between the outer contact layer 21 and the inner contact layer 23, the outer contact layer 21 and the inner contact layer 23 are insulated from each other, thereby enabling the bottom shell 10 and the cover 20 to be insulated from each other to prevent the two electrodes of the battery cell 40 from being conducted with each other. The bottom walls 11 of the cover 20 and the bottom shell 10 are respectively used as two output electrodes of the battery, and the two output electrodes can be prevented from being conducted with each other to be short-circuited. It can be understood that the outer connecting portion 231 faces towards the outside of the cover 20 through the insulation opening portion 222 and the conductive opening portion for being electrically connected to the outer device. The outer connection portion 231 may be located at the bottom of the insulation opening portion 222 and the welding opening portion 213, and may also protrude toward the outside of the battery housing and sequentially passes through the insulation opening portion 222 and the welding opening portion 213, which is not limited herein. It is only necessary to meet the requirement that the outer connecting portion 231 may be exposed to the cover 20. In the related art, the housing of the current button battery is matched with the upper shell and the lower shell and a plastic insulating ring is located between them, and the side wall of the battery housing has a three-layer structure. While, the side wall 12 of the present disclosure can only be a layer. The battery housing of the present application improves the internal available space and the capacity of the entire battery.

The welding portion 211 is the position where the outer contact layer 21 is used for welding with the welding support portion 121, and the welding portion 211 is disposed on the peripheral wall of the outer contact layer 21. The maximum outer diameter of the outer contact layer 21 is greater than the maximum outer diameter of the inner contact layer 23, that is, the welding portion 211 protrudes out of the peripheral wall of the outer contact layer 21 in the radial direction, thereby enabling the peripheral wall of the inner contact layer 23 and the welding support portion 121 to keep a distance therebetween to prevent the outer contact layer 21 from contacting with the side wall 12. The welding opening portion 213 is a position of the opening of the outer contact layer 21, and the welding bonding portion 212 is configured to bond with the insulating layer 22. The welding portion 211 is welded to the side wall 12, to enable the cover 20 and the bottom shell 10 to be fixed to each other, and to enable the outer contact layer 21 and the side wall 12 to be electrically connected. The insulating opening portion 222 of the insulating layer 22 corresponds to the welding opening portion 213 of the outer contact layer 21, so that the outer electrical connecting portion 231 of the inner contact layer 23 may pass through the insulating opening portion 222 and the welding opening portion 213 to face towards the outer side of the battery housing. The insulating opening portion 222 and the welding opening portion 233 may be disposed in the middle of the cover 20, so that the outer electrical connecting portion 231 and each position of the side wall 12 can maintain a sufficient distance.

The electrode of the battery cell 40 may directly contact with the outer electrical connecting portion 231 of the inner contact layer 23. The top surface and the bottom surface of the insulating bonding portion 221 are adhered to the conductive bonding portion 233 and the welding bonding portion 212 respectively, so as to enable the outer contact layer 21 and the inner contact layer 23 to be insulated from each other. The inner contact layer 23 and the side wall 12 are welded to be sealed, and the outer contact layer 21 and the inner contact layer 23 are seamlessly bonded through the insulating layer 22, thereby enabling the bottom shell 10 to be sealed by the cover 20. When the inner contact layer 23 and the side wall 12 are welded, the inner contact layer 23 and the outer contact layer 21 have been insulated and connected in advance, and therefore there is no need to additionally provide an insulating film.

The insulating layer 22 is made of a material having insulation performance and electrolyte corrosion resistance and having a thermal shrinkage of 6% or less at a temperature greater than or equal to 100° C. The thermal shrinkage rate refers to a volume change of the thermoplastic material due to its inherent thermal expansion rate. That is, when the temperature is greater than or equal to 100° C., the volume variation of the insulating layer 22 does not exceed 6% of the original volume, so that the insulating layer 22 can be fully melted and then fully connected to the inner contact layer 23 and the outer contact layer 21 to ensure the bonding effect. The bonding strength, between the insulating layer 22 and the conductive bonding portion 233 or between the insulating layer 22 and the welding bonding portion 212, is greater than or equal to 1.0 N/square mm, which may ensure the bonding stability between the insulating layer 22 and the inner contact layer 23 or between the insulating layer 22 and the outer contact layer 21. Specifically, the bonding strength between the insulating bonding portion 221 and the conductive bonding portion 233, or between the insulating bonding portion 221 and the welding bonding portion 212 is less than or equal to 5.0 N/mm, so as to prevent the internal stress of the cover 20 from being too high, thereby preventing the cover 20 from being damaged due to an internal force during subsequent processing or use. The thickness of the insulating bonding portion 221 is D3 and D3 is set to be 0.01 mm-2.5 mm, so that the insulating bonding portion 221 can stably bear the change of the temperature or external force to improve the bonding stability of the insulating bonding portion 221, and at the same time, the overall thickness of the cover 20 can be reasonably controlled.

The contact area between the insulating bonding portion 221 and the inner side of the battery housing is S0, and S0 satisfies: S0>=π*D2*D3*½. It should be noted that the contact area between the insulating bonding portion 221 and the inner side of the battery housing is the area of the insulating opening portion 222 exposed to the electrolyte, and is also the area of the outer peripheral wall of the insulating layer 22. the area of the outer peripheral wall of the insulating layer 22 is S0, S0 satisfies: S0=equal to π*D3*D8, wherein the maximum outer diameter of the insulating layer 22 is D8. That is, the maximum outer diameter of the insulating layer 22 should satisfy: D8>=D2*½. On the basis of reasonably controlling the contact area between the insulating bonding portion 221 and the inner side of the battery housing, the connecting area of the insulating bonding portion 221 and the conductive bonding portion 233 can be effectively increased for reducing the corrosion area of the electrolyte to the insulating layer 22, and improving the bonding stability of the insulating layer 22 and the inner contact layer 23.

The battery housing includes the bottom shell 10 and the cover 20, and the cover 20 includes the outer contact layer 21, the insulating layer 22 and the inner contact layer 23. Wherein the electrode connecting portion 232 of the inner contact layer 23 is electrically connected to one pole 410 of the battery cell 40, and another pole 410 of the battery cell 40 is electrically connected to the bottom shell 10. The outer contact layer 21 and the bottom shell 10 are welded to enable the battery cell 40 to be sealed. The inner contact layer 23 and the outer contact layer 21 are insulated by the insulating layer 22, so that the bottom shell 10 is also insulated from the outer contact layer 21, thereby preventing the two electrodes of the battery cell 50 from being mutually conducted and short-circuited. Since the inner contact layer 23 and the outer contact layer 21 of the cover 20 are pre-insulated, the outer contact layer 21 and the bottom shell 10 just need to be welded when the bottom shell 10 is packaged by the cover 20, and an insulating film does not need to be arranged. Therefore, the packaging process of the battery can be simplified, and the packaging efficiency is improved. In addition, S0 satisfies: S0>=π*D2*D3*½, so that the bonding area between the insulating bonding portion 221 and the inner contact layer 23 and the bonding area between the insulating bonding portion 221 and the outer contact layer 21 can be increased, thereby improving the bonding stability.

Specifically, the outer contact layer 21 is made of stainless steel, and the thickness of the outer contact layer 21 is D4 and D4 is 0.1 mm-0.25 mm; and/or, the inner contact layer 23 is made of stainless steel, and the thickness of the inner contact layer 23 is D5 and D5 is 0.1 mm-0.25 mm. For example, D4 and D5 may be one of 0.1 mm, 0.15 mm, 0.2 mm, 0.25 mm, 0.3 mm, 0.35 mm, 0.5 mm, 1.0 mm, 1.2 mm, 1.4 mm, 1.6 mm, 1.8 mm, 2.0 mm, and 2.5 mm. The stainless steel can be 304 stainless steel. The 304 stainless steel, containing high nickel, is in an austenite single-phase structure at room temperature, and has high corrosion resistance, good cold forming and weldability. The 304 stainless steel has high plasticity and toughness at low temperature, room temperature and high temperature. The outer contact layer 21 and the inner contact layer 23 are arranged to be SUS304, so that the structural stability of the cover 20 in the processing process can be ensured, and the chemical stability of the cover 20 in use can be ensured.

D4 and D5 are set to be 0.1 mm-0.25 mm, so that the outer contact layer 21 and the inner contact layer 23 can have sufficient structural strength, and the overall thickness of the cover 20 can be reasonably controlled. In practical applications, the insulating layer 22 is made of one or more of PP (polypropylene), PFA (a copolymer of a small amount of perfluoropropyl perfluorovinyl ether and polytetrafluoroethylene), PVDF (polyvinylidene fluoride), PTFE (polytetrafluoroethylene), ETFE (ethylene-tetrafluoroethylene copolymer), and PVC (polyvinyl chloride).

In an embodiment, the area of the insulating bonding portion 221 is S1, the area of the insulating layer 22 is S2, and the area of the outer contact layer 21 is S3. S1, S2 satisfy: S1/S2>=0.6; and/or S1, S3 satisfy S1/S3>=0.5. Thus, the bonding area of the insulating layer 22 and the inner contact layer 21 is effectively ensured, and the connection stability of the insulating layer 22 and the outer contact layer 21 is improved. Meanwhile, the size of the insulating opening portion 222 can be reasonably controlled, thereby effectively controlling the area of the outer connecting portion 231, and increasing the area utilization rate of the inner contact layer 23.

Figure 3:
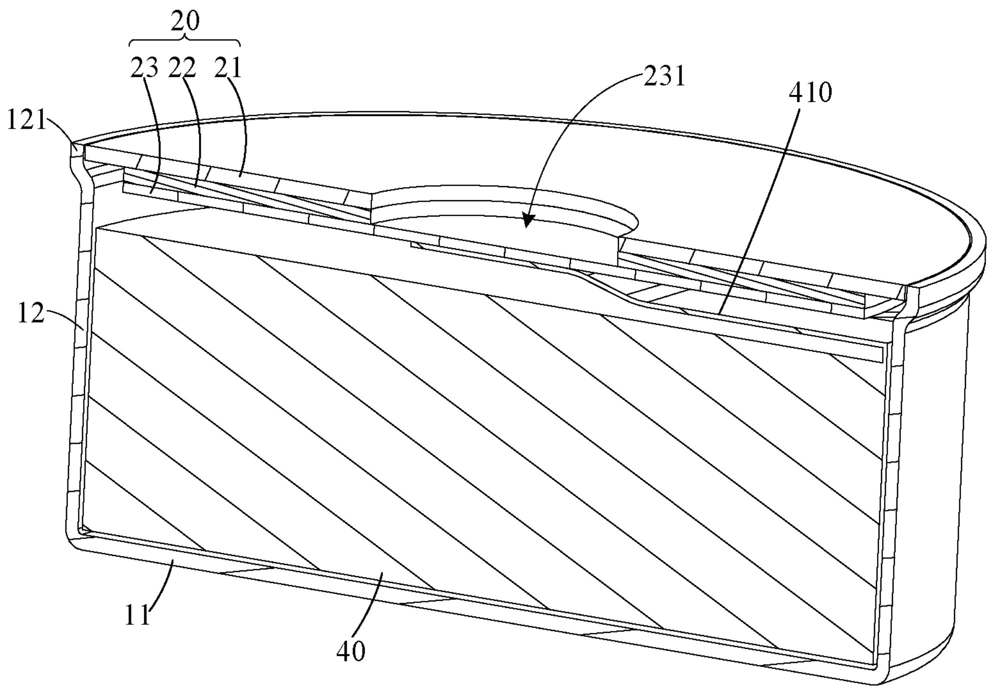
FIG. 3 is a schematic cross-sectional view of the first embodiment of a battery housing of the present disclosure.

In an embodiment, as shown in FIG. 3, the first surface of the conductive bonding portion 233, close to the insulating bonding portion 221, is provided with a first bonding enhancement layer 234 for reinforcing the bonding strength between the conductive bonding portion 233 and the insulating bonding portion 221; and/or the second surface of the welding bonding portion 212, close to the insulating bonding portion 221, is provided with a second bonding enhancement layer 214 for reinforcing the bonding strength between the welding bonding portion 212 and the insulating bonding portion 221. The specific form of the first adhesive reinforcing layer 234 is not limited, and the connection area between the first bonding enhancement layer 234 and the insulating bonding portion 221 is just increased to enhance the bonding strength. For example, the first bonding enhancement layer 234 may be a protrusion. The specific form and function of the second bonding enhancement layer 214 may refer to the first bonding enhancement layer 234. It should be noted that the he first bonding enhancement layer 234 and the second bonding enhancement layer 214 may be indirectly matched with each other via the insulating layer 22 to further improve the bonding stability of the outer contact layer 21, the insulating layer 22, and the inner contact layer 23.

Figure 4:
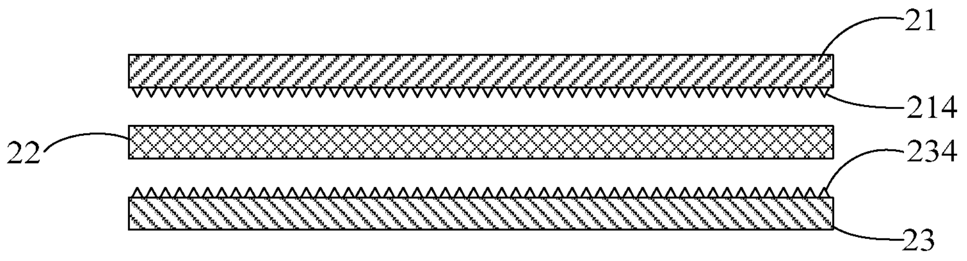
FIG. 4 is a schematic cross-sectional view of an embodiment of a cover of the present disclosure.

Specifically, as shown in FIG. 4, the first bonding enhancement layer 234 is a first uniform rough layer which is formed by performing sand blasting on the first surface of the first stainless steel layer close to the insulating bonding portion 221, and/or the second bonding enhancement layer 214 is a second uniform rough layer which is formed by performing sand blasting on the first surface of the first stainless steel layer close to the insulating bonding portion 221. It can be understood that the uniformity in this embodiment is not absolutely uniform. The first surface is subjected to sand blasting to form a natural uniform rough surface. The first rough surface enables the bonding force between different parts of the first surface and the insulating bonding portion 221 to be more uniform, thereby avoiding stress concentration. Similarly, the second rough surface can also make the bonding force between different parts of the second surface and the insulating bonding portion 221 more uniform. The first bonding enhancement layer 234 and the second bonding enhancement layer 214 are formed by sandblasting, so that the processing modes of the first bonding enhancement layer 234 and the second bonding enhancement layer 214 can be simplified to improve the processing efficiency.

In a second embodiment, the first bonding enhancement layer 234 is a first inclined piece protruding from the first surface and having a certain inclination angle with the first surface, the height of the first inclined piece is smaller than the thickness of the insulating bonding portion 221. the second bonding enhancement layer 214 is a second inclined piece protruding from the second surface and having a certain inclination angle with the second surface, the height of the second inclined piece is smaller than the thickness of the insulating bonding portion 221. The first inclined piece and the second inclined piece are opposite in inclination direction and are alternately arranged with each other. The plurality of first inclined pieces are distributed on the first surface, and the melted bonding insulating layer 22 can be filled in a space between two adjacent first inclined pieces so as to be adhered and connected to the side surfaces of the first inclined pieces. The height of the first inclined piece is the vertical distance between the end of the first inclined piece and the first surface, the height of the first inclined piece is smaller than the thickness of the insulating bonding portion 221, and the first inclined piece can be prevented from contacting with the second stainless steel layer after passing through the insulating bonding portion 221. The distribution manner and function of the second inclined piece may refer to the first inclined piece. The first inclined piece and the second inclined piece are alternately arranged in the length direction, so that the first inclined piece and the second inclined piece which are inserted into the insulating bonding portion 221 can be adjacent to each other. On the basis of not reducing the thickness of the insulating bonding portion 221, the outer contact layer 21 and the inner contact layer 23 can be closer to each other to improve the structural strength of the cover 20.

In a third embodiment, the first bonding enhancement layer 234 is a first groove recessed in the first surface, and the recess direction of the first groove is far away from the insulating bonding layer; and/or the second bonding enhancement layer 214 is a second groove recessed in the second surface, and the recess direction of the second groove is far away from the insulating bonding layer. There is a plurality of first grooves distributed on the first surface, and the melted insulating bonding portion 221 can be filled in the plurality of first grooves to increase the connection area with the first surface, thereby enhancing the bonding strength between the outer contact layer 21 and the insulating bonding portion 221. The arrangement manner and function of the second groove may refer to the first groove, and details are not described herein.

Figure 5:
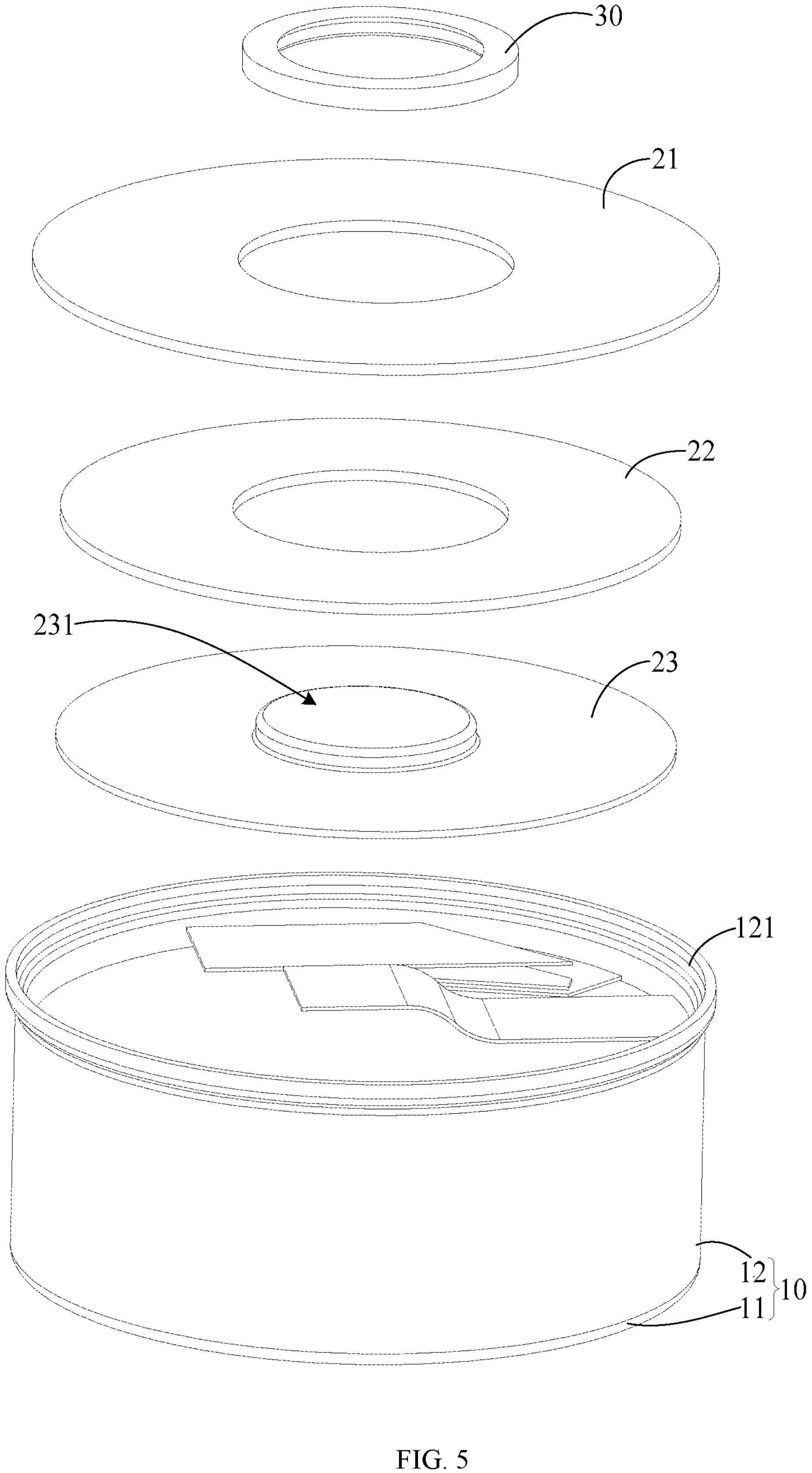
FIG. 5 is an exploded view of a second embodiment of a battery housing.
Figure 6:
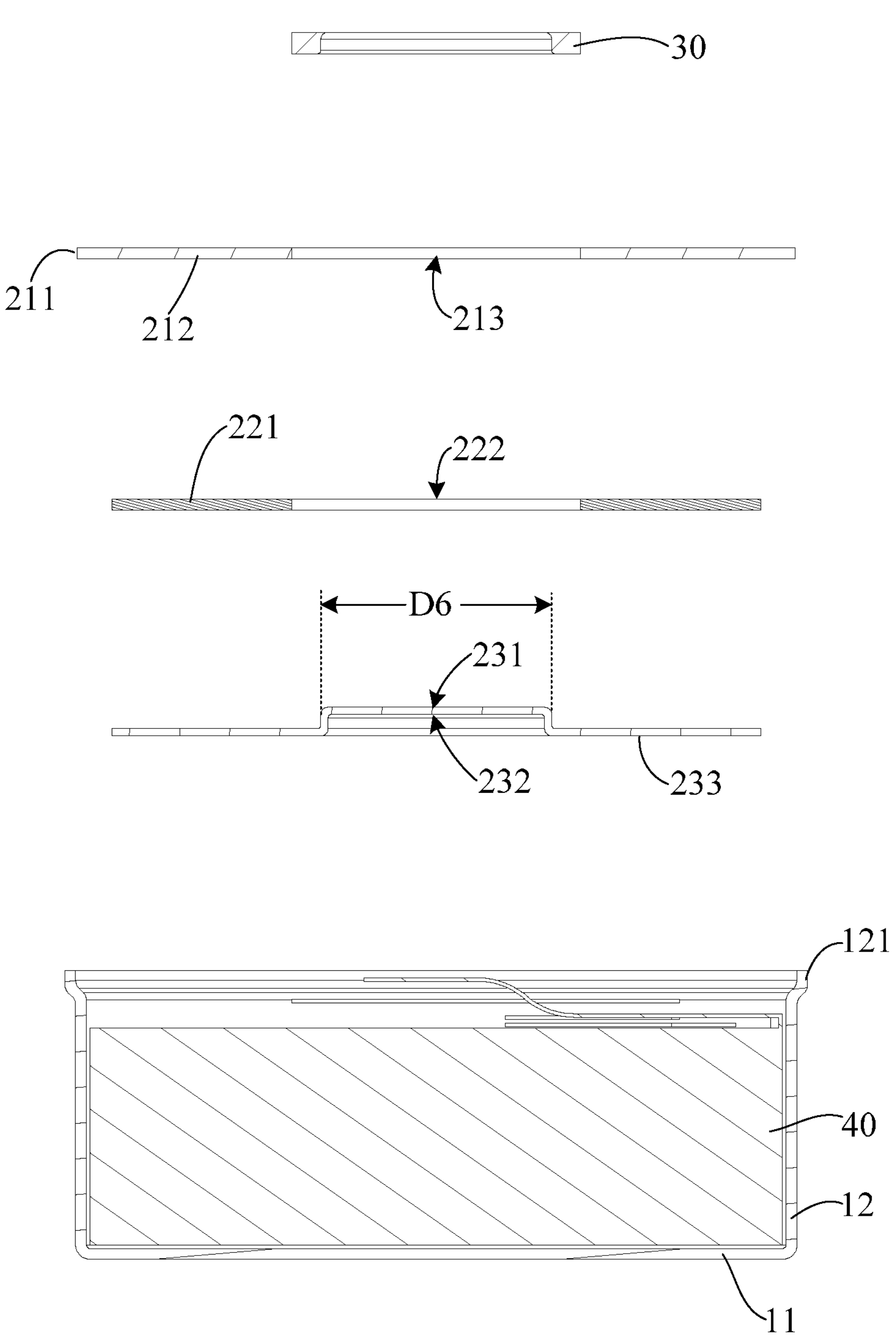
FIG. 6 is a cross-sectional and exploded view of a second embodiment of a battery housing.
Figure 7:
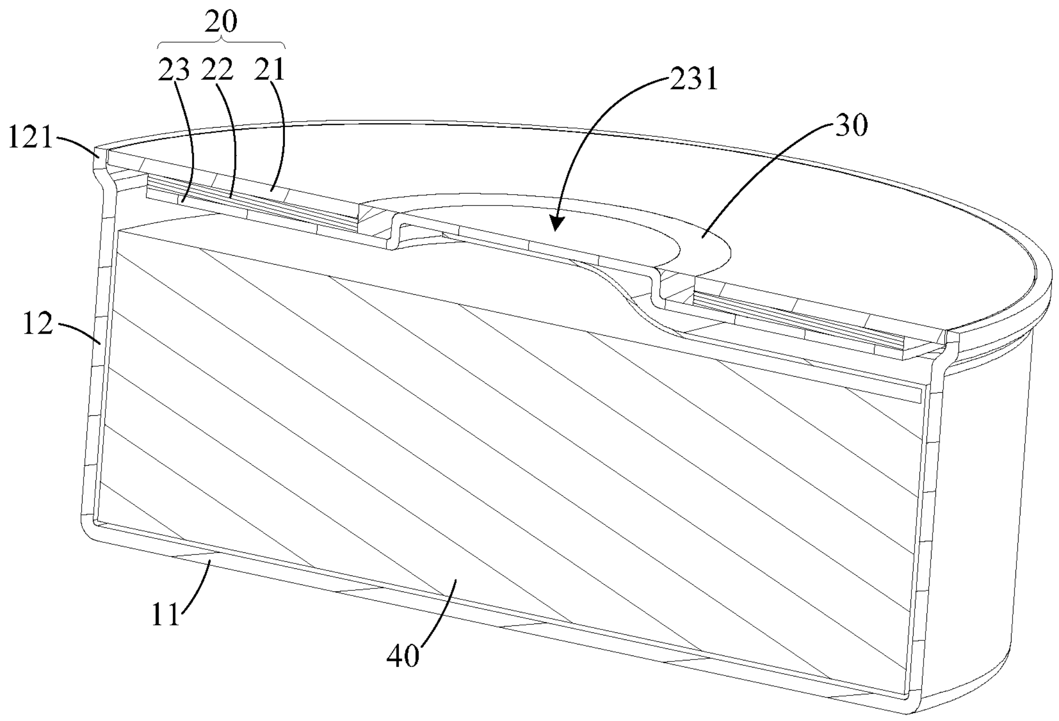
FIG. 7 is a schematic cross-sectional view of a second embodiment of a battery housing.

In an embodiment, as shown in FIGS. 5 to 7, the outer connecting portion 231 protrudes towards the outside of the battery housing and sequentially passes through the insulation opening portion 222 and the welding opening portion 213, The diameter of the outer connecting portion 231 is D6, and D6 is less than or equal to a half of the maximum outer diameter of the inner contact layer 23. The outer connecting portion 231 protrudes toward the outside of the battery housing, and it is convenient for the outer connecting portion 231 to be electrically connected to the outer device to improve the convenience of use of the battery. The diameter of the outer connecting portion 231 is less than or equal to a half of the maximum outer diameter of the inner contact layer 23, which enables the conductive bonding portion 233 to have enough area to bond with the insulation layer 22 to ensure the bonding stability. It should be noted that the outer connecting portion 231 and the welding opening portion 213 of the outer contact layer 21 should have a sufficient space to prevent the outer connecting portion 231 from contacting with the welding bonding portion 212 when the battery housing is squeezed.

Specifically, as shown in FIG. 7, the battery housing further includes a protection member 30, and the protection member 30 is formed by curing a liquid glue filled in a gap located among the outer connecting portion 231, the insulating opening portion 222, and the welding opening portion 213 after the cover 20 and the bottom housing 10 are sealed. The gap, located among the outer connecting portion 231, the insulating opening portion 222, and the welding opening portion 213, extends in the circumferential direction of the outer connecting portion 231. The protection member 30 is annular and is installed in the gap. The protection member 30 may not only cover the exposed portion of the insulating bonding portion 221, but also effectively isolate the outer electrical connecting portion 231 from the welding bonding portion 212, thereby preventing the outer contact layer 21 and the inner contact layer 23 from forming electrical conduction. It can be understood that the protection member 30 is configured to be formed by curing the liquid glue, so that the outer contact layer 21 is insulated from the inner contact layer 23, and the acting force of the protection member 30 on the outer contact layer 21 and the outer electric connection portion 231 can be reduced, which enables the outer contact layer 21 and the outer electrical connecting portion 231 to be prevented from deforming, thereby ensuring the structural stability of the battery housing.

Figure 8:
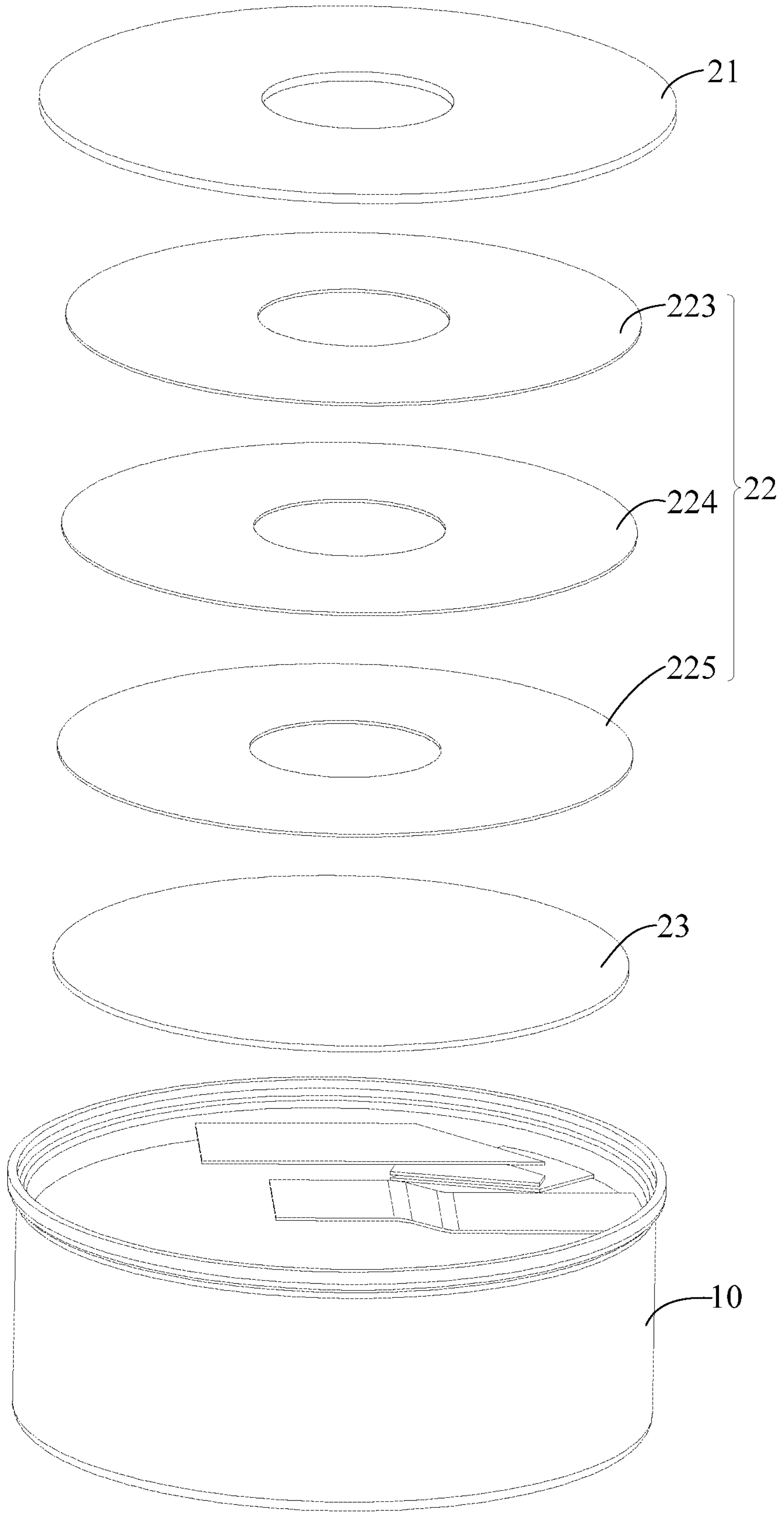
FIG. 8 is an exploded view of a third embodiment of another embodiment of a battery housing.

In an embodiment, as shown in FIG. 8, the insulating layer 22 may include a first bonding layer 223, an anti-conduction layer 224, and a second bonding layer 225. Wherein the first bonding layer 223 bonds the outer contact layer 21 with the anti-conduction layer 224, the second bonding layer 225 bonds the inner contact layer 23 with the anti-conduction layer 224, and the anti-conduction layer 224 can ensure that the outer contact layer 21 and the inner contact layer 23 are insulated from each other. In this way, the first bonding layer 223 and the second bonding layer 225 only need to have bonding performance, the anti-conduction layer 224 only needs to have insulating performance. The two performances of the insulating layer 22 are realized through different functional layers, thereby enabling the bonding performance and the insulating performance of the corresponding layers to be enhanced, and enabling the overall performance of the insulating layer 22 to be improved.

The present disclosure further provides a battery. The battery includes a battery cell 40 and a battery housing. The specific structure of the battery housing refers to the above-mentioned embodiments. Since the battery adopts all the technical solutions of all the above embodiments, all of the beneficial effects brought by at least the technical solution of the above embodiments are not repeated herein. One electrode of the battery cell 50 is electrically connected to the outer contact layer 21 of the battery housing, and the other electrode is electrically connected to the inner contact layer 23 and/or the bottom shell 10 of the battery housing. The battery may be configured as a button battery, and the button battery is mainly applied to an electronic product to provide electrical energy for the electronic product. The electronic product may be an earphone, a watch, or the like, with a small voltage.

The above description is merely an alternative embodiment of the present application, and is not therefore intended to limit the patent scope of the present application, and any equivalent structural transformation made by using the description and drawings of the present application, or directly/indirectly applied to other related technical fields, is included within the scope of the patent protection of the present application under the inventive concept of the present application.

Besides, it can be understood that, although the present disclosure is describe according to the embodiments, each embodiment does not include only on dependent technology solution. The description of the present disclosure is only for clarity. The person skilled in the art should regard the present disclosure as an entirety. Technology solutions in the embodiments can be adequately combined to form other embodiments that can be understood by the person skilled in the art.

What is claimed is:

1. A battery housing for a button battery, comprising:

a cup-shaped bottom shell, the cup-shaped bottom shell comprising a circular or oval bottom wall and an annular side wall, and the cup-shaped bottom shell defining a receiving opening; and a cover configured to seal the receiving opening, the cover comprising an outer contact layer, an insulating layer, and an inner contact layer from outside to inside; the inner contact layer comprising an outer electrical connecting portion, an electrode connecting portion, and a conductive bonding portion; the insulating layer comprising an insulating bonding portion and an insulating opening portion; the outer contact layer comprising a welding portion, a welding bonding portion, and a welding opening portion; the side wall comprising a welding support portion close to the receiving opening, wherein a maximum outer diameter of the outer contact layer is D1, a maximum outer diameter of the inner contact layer is D2, and D1 is greater than D2, wherein both D1 and D2 are measured in millimeters (mm);

wherein the electrode connecting portion is located on a surface of the inner contact layer facing towards an inner side of the battery housing, the electrode connecting portion is configured to be electrically connected to a pole of a battery cell to enable the inner contact layer to be electrically connected to the battery cell; the outer electrical connecting portion is configured to pass through the insulating opening portion and the welding opening portion to be electrically connected to an outer device; the conductive bonding portion is configured to be seamlessly bonded to the insulating bonding portion, to enhance a strength of the cover and reduce a direct contact area between the insulating bonding portion and an inner side of the battery housing, and to prevent external water from permeating into the battery housing; the welding portion is configured to be welded with the welding supporting portion, thereby enabling the cover and the bottom shell to be sealed; the welding bonding portion is configured to enhance the strength of the cover and prevent external water from permeating into the battery housing;

wherein the insulating bonding portion is configured to be seamlessly bonded to the conductive bonding portion and the welding bonding portion by melting an insulating anti-electrolyte corrosion material ay ≥100° C. before the cover and the bottom shell are sealed, the insulating anti-electrolyte corrosion material is one or more selected from polypropylene (PP), a copolymer of a small amount of perfluoropropyl perfluorovinyl ether and polytetrafluoroethylene (PFA), polyvinylidene fluoride (PVDF), polytetrafluoroethylene (PTFE), ethylene-tetrafluoroethylene copolymer (ETFE), and polyvinyl chloride (PVC), and the insulating anti-electrolyte corrosion material has a thermal shrinkage rate of 6%, and a bonding strength, between the insulating bonding portion and the conductive bonding portion or between the insulating bonding portion and the welding bonding portion, is greater than or equal to 1.0 N per square millimeter after the insulating anti-electrolyte corrosion material is at a room temperature; a thickness of the insulating bonding portion is D3, and D3 is 0.01 mm-2.5 mm; the contact area between the insulating bonding portion and the inner side of the battery housing is S0, and S0 satisfies: $S0 \geq \pi * D2 * D3 * \frac{1}{2}$, wherein π is a mathematical constant pi; the outer contact layer is made of stainless steel, and a thickness of the outer contact layer is D4 and D4 is 0.1 mm-0.25 mm; and/or the inner contact layer is made of stainless steel, and a thickness of the inner contact layer is D5 and D5 is 0.1 mm-0.25 mm.

2. The battery housing according to claim 1, wherein the insulating layer is made of one or more of PP, PFA, PVDF, PTFE, ETFE and PVC.

3. The battery housing according to claim 1, wherein a bonding strength between the insulating bonding portion and the conductive bonding portion, or between the insulating bonding portion and the bonding portion, is less than or equal to 5.0 N/mm at a room temperature.

4. The battery housing according to claim 1, wherein an area of the insulating bonding portion is S1, and an area of the insulating layer is S2, and an area of the outer contact layer is S3, and S1, S2, S3 satisfy: $S1/S2 \geq 0.6$ and/or $S1/S3 \geq 0.5$.

5. The battery housing according to claim 1, wherein a first bonding enhancement layer is placed on a first surface of the conductive bonding portion close to the insulating bonding portion;

the first bonding enhancement layer is configured to reinforce a bonding strength between the insulating bonding portion and the conductive bonding portion;

and/or a second bonding enhancement layer is placed on a second surface of the welding bonding portion close to the insulating bonding portion, and the second bonding enhancement layer is configured to reinforce a bonding strength between the insulating bonding portion and the welding bonding portion.

6. The battery housing according to claim 1, wherein the outer electrical connecting portion is located at bottom portions of the insulation opening portion and the welding opening portion.

7. The battery housing according to claim 1, wherein the outer electrical connecting portion protrudes toward an outer side of the battery housing and is configured to sequentially pass through the insulation opening portion and the welding opening portion, and a diameter of the outer connecting portion is less than or equal to a half of the maximum outer diameter of the inner contact layer.

8. The battery housing according to claim 1, wherein the battery housing further comprises a protection member, and the protection member is formed by curing a liquid glue at a room temperature after the cover and the bottom shell are sealed, and the liquid glue is filled in a gap among the outer electrical connecting portion, the insulation opening portion, and the welding opening portion.

9. A battery, comprising:

a battery cell; and a battery housing, the battery housing comprising a bottom shell and a cover, the bottom shell comprising a bottom wall and an annular side wall, and the bottom shell defining a receiving opening; the cover configured to seal the receiving opening, the cover comprising an outer contact layer, an insulating layer, and an inner contact layer from outside to inside; the inner contact layer comprising an outer electrical connecting portion, an electrode connecting portion, and a conductive bonding portion; the insulating layer comprising an insulating bonding portion and an insulating opening portion; the outer contact layer comprising a welding portion, a welding bonding portion, and a welding opening portion; the side wall comprising a welding support portion close to the receiving opening, wherein a maximum outer diameter of the outer contact layer is D1, a maximum outer diameter of the inner contact layer is D2, and D1 is greater than D2, wherein both D1 and D2 are measured in millimeters (mm);

wherein the electrode connecting portion is located on a surface of the inner contact layer facing towards an inner side of the battery housing, the electrode connecting portion is configured to be electrically connected to a pole of a battery cell to enable the inner contact layer to be electrically connected to the battery cell; the outer electrical connecting portion is configured to pass through the insulating opening portion and the welding opening portion to be electrically connected to an outer device; the conductive bonding portion is configured to be seamlessly bonded to the insulating bonding portion, to enhance a strength of the cover and reduce a direct contact area between the insulating bonding portion and an inner side of the battery housing, and to prevent external water from permeating into the battery housing; the welding portion is configured to be welded with the welding supporting portion, thereby enabling the cover and the bottom shell to be sealed; the welding bonding portion is configured to enhance the strength of the cover and prevent external water from permeating into the battery housing;

wherein the insulating bonding portion is configured to be seamlessly bonded to the conductive bonding portion and the welding bonding portion by melting an insulating anti-electrolyte corrosion material at ≥100° C. before the cover and the bottom shell are sealed, the insulating anti-electrolyte corrosion material is one or more selected from polypropylene (PP), a copolymer of a small amount of perfluoropropyl perfluorovinyl ether and polytetrafluoroethylene PFA), polyvinylidene fluoride (PVDF), polytetrafluoroethylene (PTFE), ethylene-tetrafluoroethylene copolymer (ETFE), and polyvinyl chloride (PVC), and the insulating anti-electrolyte corrosion material has a thermal shrinkage rate of 6%, and a bonding strength, between the insulating bonding portion and the conductive bonding portion or between the insulating bonding portion and the welding bonding portion, is greater than or equal to 1.0 N per square millimeter after the insulating anti-electrolyte corrosion material is at a room temperature; a thickness of the insulating bonding portion is D3, and D3 is 0.01 mm-2.5 mm; the contact area between the insulating bonding portion and the inner side of the battery housing is S0, and S0 satisfies: $S0 \geq \pi * D2 * D3 * \frac{1}{2}$, wherein π is a mathematical constant pi; the outer contact layer is made of stainless steel, and a thickness of the outer contact layer is D4 and D4 is 0.1 mm-0.25 mm; and/or the inner contact layer is made of stainless steel, and a thickness of the inner contact layer is D5 and D5 is 0.1 mm-0.25 mm.

10. The battery according to claim 9, wherein the insulating layer is made of one or more of PP, PFA, PVDF, PTFE, ETFE and PVC.

11. The battery according to claim 9, wherein a bonding strength between the insulating bonding portion and the conductive bonding portion, or between the insulating bonding portion and the bonding portion, is less than or equal to 5.0 N/mm at a room temperature.

12. The battery according to claim 9, wherein an area of the insulating bonding portion is S1, and an area of the insulating layer is S2, and an area of the outer contact layer is S3, and S1, S2, S3 satisfy: $S1/S2 \geq 0.6$ and/or $S1/S3 \geq 0.5$.

13. The battery according to claim 9, wherein a first bonding enhancement layer is placed on a first surface of the conductive bonding portion close to the insulating bonding portion;

the first bonding enhancement layer is configured to reinforce a bonding strength between the insulating bonding portion and the conductive bonding portion;

and/or a second bonding enhancement layer is placed on a second surface of the welding bonding portion close to the insulating bonding portion, and the second bonding enhancement layer is configured to reinforce a bonding strength between the insulating bonding portion and the welding bonding portion.

14. The battery according to claim 9, wherein the outer electrical connecting portion is located at bottom portions of the insulation opening portion and the welding opening portion.

15. The battery according to claim 9, wherein the outer electrical connecting portion protrudes toward an outer side of the battery housing and is configured to sequentially pass through the insulation opening portion and the welding opening portion, and a diameter of the outer connecting portion is less than or equal to a half of the maximum outer diameter of the inner contact layer.

16. The battery according to claim 9, wherein the battery housing further comprises a protection member, and the protection member is formed by curing a liquid glue at a room temperature after the cover and the bottom shell are sealed, and the liquid glue is filled in a gap among the outer electrical connecting portion, the insulation opening portion, and the welding opening portion.

* * * * *